US011190525B2

(12) United States Patent
Zhang et al.

(10) Patent No.: US 11,190,525 B2
(45) Date of Patent: Nov. 30, 2021

(54) BLOCKCHAIN SYSTEM AND PERMISSION MANAGEMENT METHOD THEREOF

(71) Applicant: CloudMinds (Shanghai) Robotics Co., Ltd., Shanghai (CN)

(72) Inventors: Yueyang Zhang, Chengdu (CN); Hui Xie, Chengdu (CN)

(73) Assignee: Cloudminds (Shanghai) Robotics Co., Ltd., Shanghai (CN)

( * ) Notice: Subject to any disclaimer, the term of this patent is extended or adjusted under 35 U.S.C. 154(b) by 0 days.

(21) Appl. No.: 16/316,837

(22) PCT Filed: Aug. 18, 2017

(86) PCT No.: PCT/CN2017/098051
§ 371 (c)(1),
(2) Date: Jan. 10, 2019

(87) PCT Pub. No.: WO2019/033394
PCT Pub. Date: Feb. 21, 2019

(65) Prior Publication Data
US 2021/0194887 A1    Jun. 24, 2021

(51) Int. Cl.
*H04L 29/06*      (2006.01)
(52) U.S. Cl.
CPC ............ *H04L 63/104* (2013.01); *H04L 63/20* (2013.01)
(58) Field of Classification Search
CPC .... H04L 63/104; H04L 63/20; G06F 21/6227
USPC .......................................................... 726/4
See application file for complete search history.

(56) References Cited

U.S. PATENT DOCUMENTS

| 8,762,357 | B2 * | 6/2014 | Hu | H04L 63/104 |
| | | | | 707/705 |
| 9,218,502 | B1 * | 12/2015 | Doermann | G06F 21/604 |
| 2019/0036932 | A1 * | 1/2019 | Bathen | H04L 9/3231 |

FOREIGN PATENT DOCUMENTS

| CN | 103701801 A | 4/2014 |
| CN | 105488431 A | 4/2016 |
| CN | 106097074 A | 11/2016 |
| CN | 106097101 A | 11/2016 |
| CN | 106302483 A | 1/2017 |

(Continued)

OTHER PUBLICATIONS

Pollack et al. 2005 IEEE 13th NASA Goddard Conference on Mass Storage Systems and Technologies "Efficient Access Control for Distributed Hierarchical File Systems" (Year: 2005).*

*Primary Examiner* — Khalil Naghdali
(74) *Attorney, Agent, or Firm* — McCoy Russell LLP

(57) ABSTRACT

The present disclosure provides a blockchain system and a permission management method thereof. The blockchain system includes a plurality of node groups, group account information of each node group is stored in a block of the blockchain, the group account information includes a permission set of the node group, and each node in the node group has all permissions in the permission set of the node group; and the permissions of the nodes in each node group are controlled by a management node in a parent group of the node group; and the permissions in the permission set of each node group are more than those of the permission set corresponding to a child group of the node group; and the member account information of each node is stored in the block of the blockchain, and the member account information includes the permissions of the node.

9 Claims, 2 Drawing Sheets

(56) References Cited

FOREIGN PATENT DOCUMENTS

| | | | |
|---|---|---|---|
| CN | 106548330 A | 3/2017 | |
| CN | 106796688 A | 5/2017 | |
| CN | 106936589 A | 7/2017 | |
| EP | 3346413 A1 * | 7/2018 | ......... G06F 16/9027 |
| KR | 101723405 B1 | 4/2017 | |

* cited by examiner

BLOCKCHAIN SYSTEM AND PERMISSION MANAGEMENT METHOD THEREOF

CROSS-REFERENCE TO RELATED APPLICATIONS

The present application is a U.S. National Phase of International Patent Application Serial No. PCT/CN2017/098051 entitled "BLOCKCHAIN SYSTEM AND PERMISSION MANAGEMENT METHOD THEREOF," filed on Aug. 18, 2017. The entire contents of the above-cited application are hereby incorporated by reference in their entirety for all purposes.

FIELD OF THE INVENTION

The present disclosure relates to the field of blockchains, and in particular to a blockchain system and a permission management method thereof.

BACKGROUND OF THE INVENTION

With the development of the blockchain technology, the blockchains are divided into three categories in the industry at present: public chains (such as bitcoin networks), consortium chains (blockchains established by a consortium of the same type of entities) and private chains (blockchain in the same company). Wherein, the public chains are open to all nodes, while the consortium chains and private chains are usually permissioned chains with permission restrictions, thereby having more guarantee in terms of security.

Specifically, the permissioned chain may have dozens of trusted nodes to undertake the task of maintaining user requests of network consensus processing, other nodes may be nodes representing a user himself, or nodes operated by an intermediate service provider for providing services for light nodes on user equipment and may also be nodes operated by a regulatory authority to supervise the transaction data in the entire network. Such a permissioned chain system is not fundamentally different from the public chain and only has difference in the management, that is, the public chain allows any anonymous user to join and quit at any time, while the permissioned chain system only allows the user passing the identity authentication to join the network, and the permissions of users on the chain are different from each other.

However, how to specifically perform permission control on the accounts on the blockchain is not considered in the prior art, for example, which accounts own which permissions, which accounts may modify the permissions of other accounts, and modify the permissions into what permissions.

SUMMARY OF THE INVENTION

The main objective of the embodiments of the present disclosure is to provide a blockchain system and a permission management method thereof. The permissions of each node in the blockchain system may be managed.

In order to achieve the above objective, a first aspect of the embodiments of the present disclosure provides a blockchain system, including a plurality of node groups, wherein group account information of each node group is stored in a block of the blockchain, the group account information includes a permission set of the node group, and each node in the node group has all permissions in the permission set of the node group; and the permissions of the nodes in each node group are controlled by a management node in a parent group of the node group, wherein the parent group of the node group refers to a node group of the immediately higher level that creates the node group; and the permissions in the permission set of each node group are more than those of the permission set corresponding to a child group of the node group, the child group of the node group refers to a node group of the immediately lower level created by the node group; and the member account information of each node is stored in the block of the blockchain, and the member account information includes the permissions of the node.

A second aspect of the embodiments of the present disclosure provides a permission management method of a blockchain system, including:

judging, by a management node in a first node group, whether a target node belongs to the first node group or belongs to a child group of the first node group, wherein the first node group is a node group of any level in the blockchain system; and if the target node belongs to the first node group or belongs to the child group of the first node group, broadcasting permission management information to the blockchain system, the permission management information includes group account information of the node group to which the target node belongs and member account information of a second node, and the permission management information is recorded in a new block when the new block is generated in the blockchain.

A third aspect of the embodiments of the present disclosure provides a non-transitory computer readable storage medium, wherein the non-transitory computer readable storage medium includes one or more programs, and the one or more programs are used for executing the method of the second aspect.

A fourth aspect of the embodiments of the present disclosure provides a blockchain node, including: the non-transitory computer readable storage medium of the third aspect; and one or more processors used for executing the program in the non-transitory computer readable storage medium.

By adoption of the above technical solutions, the purpose of managing different permission sets by using the group relationship of a tree structure is achieved, the management range is constrained by using the higher-lower-level relationship and the peer relationship between tree nodes, a flexible and intuitive permission management effect is realized, the group account information and the member account information are stored in the block of the blockchain, and a secure and reliable permission grouping management system is constructed by using the tamper-proof features of the blockchain.

BRIEF DESCRIPTION OF THE DRAWINGS

To illustrate technical solutions in the embodiments of the present disclosure or in the prior art more clearly, a brief introduction on the drawings which are needed in the description of the embodiments is given below. Apparently, the drawings in the description below are merely some of the embodiments of the present disclosure, and based on which other drawings may be obtained by those of ordinary skill in the art without any creative effort.

DETAILED DESCRIPTION OF THE EMBODIMENTS

In order that the purposes, technical solutions and advantages of the present disclosure are clearer, a clear and complete description of technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those of ordinary skill in the art based on the embodiments of the present disclosure without any creative effort, fall into the protection scope of the present invention.

In order to enable those of skill in the art to understand the technical solutions provided by the embodiments of the present invention more easily, the related technologies involved will be first briefly introduced below.

A blockchain is a decentralized distributed database system in which all nodes in a blockchain network participate in maintenance. It is composed of a series of data blocks generated on the basis of cryptography, and each data block is a block in the blockchain. According to the sequence of generation time, the blocks are linked together orderly to from a data chain, which is vividly called the blockchain.

In a block generation mechanism based on PoW (Proof of Work), the generation of effective blocks requires that mining nodes in the blockchain network correctly solve a mathematical problem requiring a calculated amount, after a result meeting specific conditions is calculated, a node device broadcasts a block including block data, and after the other node devices approve that the block conforms to the format and standard defined by a protocol, the block may be added to the blockchain, wherein all node devices in the blockchain network store complete blockchain blocks locally.

It is worth noting that, with reference to a bitcoin application, the above block data may include transaction data broadcasted by each node device in a transaction process. The transaction data usually includes a certain currency attribute, as well as the owner's digital signature and the address of the recipient. After the transaction data is written into the block, the ownership is transferred to the recipient by verifying the digital signature of the owner.

A permissioned chain adds the permission control of the node devices on the basis of the blockchain, thus it may require that users can join the network after passing the identity authentication, and the permissions of each user on the permissioned chain may be different.

Figure 1:
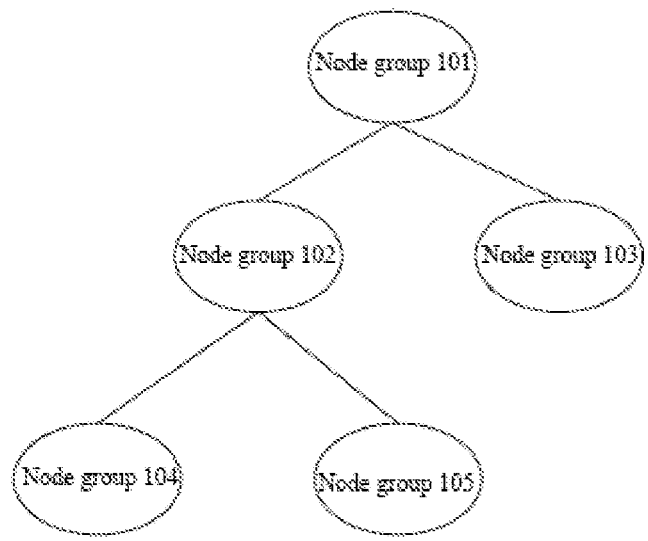
FIG. 1 is a structural schematic diagram of a blockchain system provided by an embodiment of the present disclosure.

In view of the problem that there is no complete blockchain permission mechanism in the prior art, the embodiment of the present disclosure provides a blockchain system 10. As shown in FIG. 1, the blockchain system 10 includes a plurality of node groups, namely a node group 101, a node group 102, a node group 103, a node group 104 and a node group 105 as shown in FIG. 1. Each node group includes at least one node, and the node refers to a node device that logs in a user account in the blockchain.

Wherein, the group account information of each node group is stored in the block of the blockchain, the group account information includes a permission set of the node group, and each node in the node group owns all permissions in the permission set of the node group.

Moreover, the permissions of the nodes in each node group are controlled by a management node in a parent group of the node group, wherein the parent group of the node group refers to a node group of the immediately higher level that creates the node group.

Moreover, the permissions in the permission set of each node group are more than those of the permission set corresponding to a child group of the node group, wherein the child group of the node group refers to a node group of the immediately lower level created by the node group.

Moreover, the member account information of each node is stored in the block of the blockchain, and the member account information includes the permissions of the node.

By adoption of the above technical solutions, different permission sets are managed by using the group relationship of a tree structure, the management range is constrained by using the higher-lower-level relationship and the peer relationship between tree nodes, a flexible and intuitive permission management effect is realized, therefore, the blockchain system has permission control (i.e. becoming a permissioned chain system), moreover, the group account information and the member account information are stored in the block of the blockchain, and a secure and reliable permission grouping management system is constructed by using the tamper-proof features of the blockchain.

Exemplarily, the permissioned chain system includes permissions shown in Table 1 below:

TABLE 1

| Permission name | Function |
|---|---|
| Miner (mining) | Whether to allow the participation in a consensus algorithm |
| Sender (Transfer) | Whether to allow to transfer the amount |
| Receiver (collection) | Whether to allow to receive the amount |
| Deployment (deployment) | Whether to allow to deploy a contract |
| Caller (call) | Whether to allow to call the contract |
| Connection (access) | Whether to allow to access a permissioned chain |
| Admin (permission management) | What permissions may be given to other nodes |

For the description of the blockchain system as shown in FIG. 1, the node group 101 is used as a root group, and its group account information may be pre-stored in a genesis block of the blockchain, and the permission set of the group account information of the node group 101 has all permissions in table 1. The node group 102 and the node group 103 are used as child groups created by the node group 101, which respectively have a part of the permissions shown in table 1. It should be noted that the node group 102 and the node group 103 are referred to as brother groups, the permission sets between the brother groups are not limited in the embodiment of the present disclosure, that is, the node group 102 and the node group 103 may have the same or partially the same permission set and may also have completely different permission sets.

The node group 104 and the node group 105 serve as the child groups of the node group 102, which have fewer permission set than the permission set of the node group 102, and the node group 102 and the node group 103 are used as the child groups of the node group 101, which have fewer permission set than the permission set of the node group 101.

In addition, the permissions shown in table 1 are only examples. In the specific implementation, the permissions in the permissioned chain system may be set according to actual application scenarios. For example, in a bank application scenario, a withdrawal ATM and a deposit ATM may be used as two node groups in the permissioned chain system, and the permissions of the withdrawal ATM group should include the permission of reading permissioned chain data, and the permissions of the deposit ATM group should include the permission of writing the permissioned chain. The specific application scenarios are not limited in the embodiment of the present disclosure.

In addition to the node group having the account information, each node also has member account information, wherein the member account information of the node includes the permissions of the node. It is worth noting that each node can have all permissions of the node group to which the node belongs by default. In a possible implementation manner of the embodiment of the present disclosure, the same node may belong to a plurality of different node groups, and a certain node may be provided with the permissions that the node do not have according to actual requirements, therefore, the permissions of the node may be more than the permissions of the node group to which the node group belongs.

The member account information of the node may further include information indicating whether the node is the management node in the belonging node group, wherein the management node may change the permissions of the node in the child group. In a possible implementation manner, the management node may also change the permissions of a non-management node in the same group.

The member account information and the group account information are described in detail below.

Specifically, the member account information of the node may include the following fields.

an Auth field used for expressing the permissions of the node;

a GroupStatus field used for expressing the node group to which the node belongs; and an Organizer field used for describing whether the node is the management node in the node group to which the node belongs.

Optionally, the member account information of the node may include: a Status field used for describing whether the node is effective in the belonging node group.

Exemplarily, the member account information of a certain node is shown as follows:

"Auth":Object{......},
"GroupStatus":{
"bccefc5abfa2f53556da6c015e1862e42e7823a1":{
"Organizer":true,
"Status":enable}
} wherein bccefc5abfa2f53556da6c015e1862e42e7823a1 represents an identifier of the node group, "Organizer": true indicates that the node belongs to the management node in the node group, and "Status": enable indicates that the node is effective in the belonging node group, wherein the management node may change the value of the Status field of a certain member node to add to or delete the member node from the node group.

The group account information of each node group includes the following fields:

a PGroup field used for expressing the parent group of the node group;

an Auth field used for expressing a permission set corresponding to the node group; and a SubStatus field used for expressing the child group of the node group.

Exemplarily, the group account information of a certain node group is shown as follows:

"PGroup": "bccefc5abfa2f53556da6c015e1862e42e7823a1",
"Auth":Object{......},
"SubStatus":{
"bccefc5abfa2f53556da6c015e1862e42e7823a3": enable
} wherein bccefc5abfa2f53556da6c015e1862e42e7823a1 represents the parent group of the node group, and bccefc5abfa2f53556da6c015e1862e42e7823a3 represents the child group of the node group.

In a possible implementation manner of the embodiment of the present disclosure, the blockchain system includes M node groups, wherein the Nth node group is the child group of the N−1th node group, N is a positive integer greater than 1 and less than M, the group account information of the Nth node group further includes a DirectMgr field used for indicating whether the Nth node group allows to be managed by grandparent group, and the grandparent groups of the Nth node group refer to the first to the N−2th node groups.

Illustration is given still by using the blockchain system 10 as shown in FIG. 1, the node group 101 is the grandparent group of the node group 104 and the node group 105, then the group account information of the node group 104 and the node group 105 may further include a DirectMgr field, for example: "DirectMgr": true, indicating that the node group allows to be managed by the grandparent group.

Figure 2:
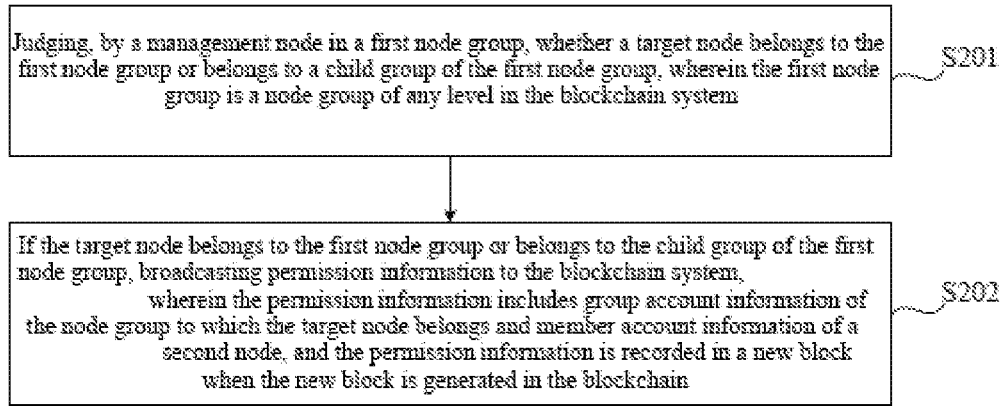
FIG. 2 is a schematic flow diagram of a permission management method of a blockchain system provided by an embodiment of the present disclosure.

The embodiment of the present disclosure further provides a permission management method of a blockchain system. As shown in FIG. 2, the method includes:

S201, judging, by a management node in a first node group, whether a target node belongs to the first node group or belongs to a child group of the first node group, wherein the first node group is a node group of any level in the blockchain system; and S202, if the target node belongs to the first node group or belongs to the child group of the first node group, broadcasting permission management information to the blockchain system, wherein the permission management information includes group account information of the node group to which the target node belongs and member account information of a second node, and the permission management information is recorded in a new block when the new block is generated in the blockchain.

Wherein, in the case that the target node belongs to the first node group or belongs to the child group of the first node group, the permission management information is used for changing the group account information of the node group to which the target node belongs or the member account information of the second node, that is to say, the permission management information includes the changed group account information of the node group to which the target node belongs, and the changed member account information of the second node.

It is worth noting that, after each permission change, the changed member account information and the group account information of the belonging group are stored in the new block of the blockchain, and the account information of the target node previously stored in the previous block is set to be invalid. Since each node locally stores all blocks of the blockchain, each node can query the recently stored group account information of the belonging group of the node and the member account information of the node in the blockchain when performing any operation, so as to determine whether the node has the permissions of executing the operation.

In a possible implementation manner of the embodiment of the disclosure, the method further includes:

if the target node does not belong to the first node group and does not belong to the child group of the target node group, judging whether the first node group is a grandparent group of the node group to which the target node belongs; if the first node group is the grandparent group of the node group to which the target node belongs, judging whether the node group to which the target node belongs allows to be managed by the grandparent group according to the group account information of the node group to which the target node belongs; and if the node group to which the target node belongs allows to be managed by the grandparent group, broadcasting the permission management information to the blockchain system.

Still referring to FIG. 1, if the management node in the node group 101 needs to change the permission of any node in the node group 104, the management node needs to query the group account information of the node group 104 to determine whether the node group 104 allows to be managed by the grandparent group, and if the node group 104 allows to be managed by the grandparent group, the management node in the node group 101 may broadcast and modify the permission management information of any node in the node group 104 in the blockchain system. If the node group 104 does not allow to be managed by the grandparent group, the management node in the node group 101 broadcasts an operation of modifying the permission management information of any node in the node group 104.

Optionally, the method further includes: if the first node group is not the grandparent group of the node group to which the target node belongs, judging whether the target node joins any node group at present; and if the target node does not join any node group at present, broadcasting the permission management information to the blockchain system.

Thus, in addition to modifying the permissions of the node, the above method may further include: creating a node group and adding the node that newly accesses the permissioned chain system to the node group. That is to say, when the target node is the node that newly accesses the permissioned chain system, the management node of the first node group has the permissions of creating a group and allowing the access of new nodes, then the management node may broadcast the permission management information, and the permission management information includes the group account information of the newly created node group, and the member account information of the newly accessed target node in the node group.

Figure 3:
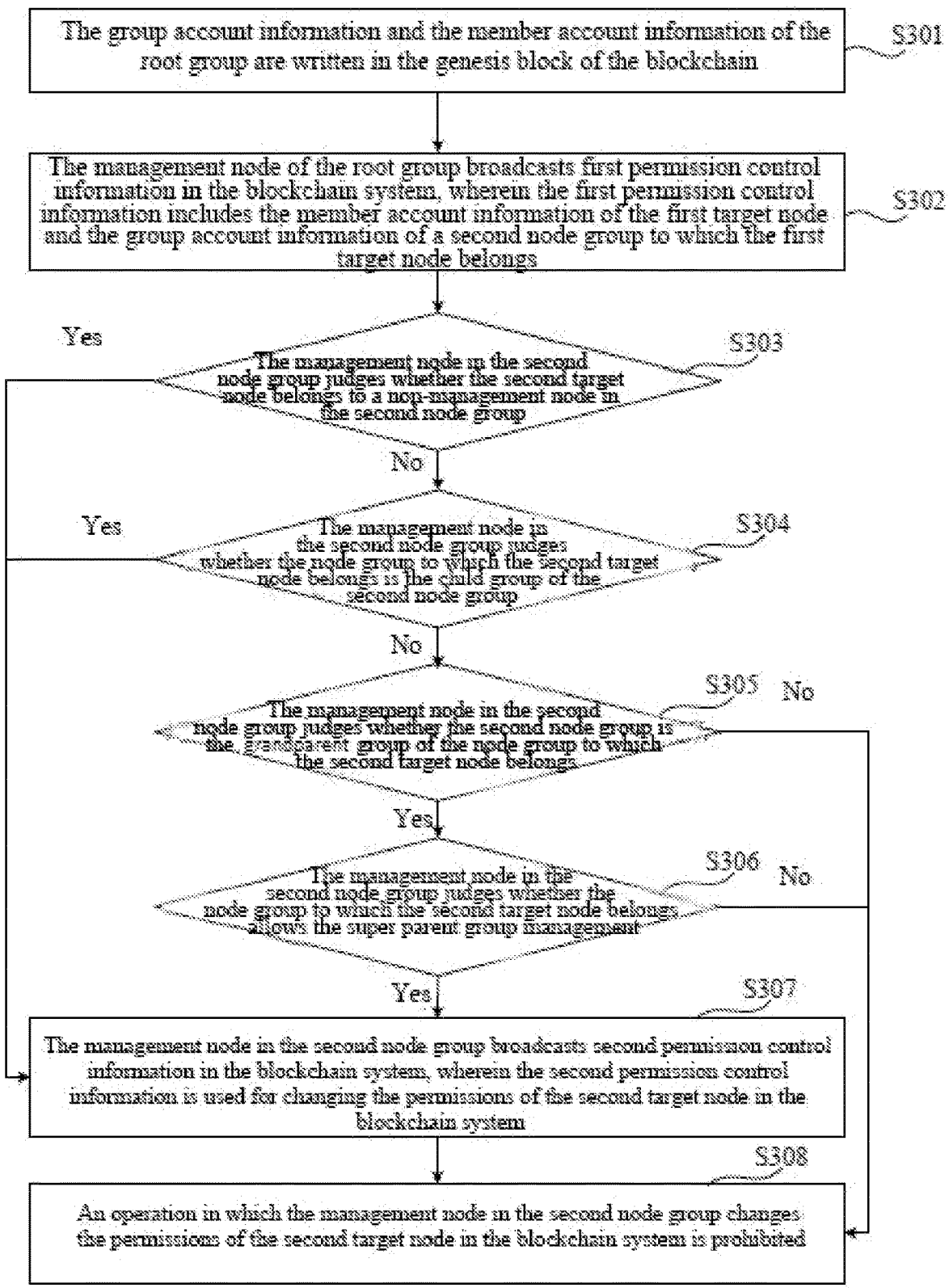
FIG. 3 is a schematic flow diagram of another permission management method of a blockchain system provided by an embodiment of the present disclosure.

In order that those skilled in the art can better understand the technical solutions provided by the embodiments of the present disclosure, the permission management method of the blockchain system is described below by a specific example. As shown in FIG. 3, the method includes:

S301, the group account information and the member account information of the root group are written in the genesis block of the blockchain.

Exemplarily, the account information of the 3292ff3619b62d584ef82863652fcfa1ac23e0c7 node is written in the genesis block:

```
{
"3292ff3619b62d584ef82863652fcfa1ac23e0c7":{
"extInfo":{
"Type": "user",
"Detail":{
"GroupStatus":{
"bccefc5abfa2f53556da6c015e1862e42e7823a1":{
"Organizer":true,
"Status": "enable"
}
}
}
}
},
"bccefc5abfa2f53556da6c015e1862e42e7823a1":{
"extInfo":{
"Type": "group",
"Detail":{
"PGroup":"",
"Auth":Object{......},
}
}
}
}
``` wherein the node 3292ff3619b62d584ef82863652fcfa1ac23e0c7 belongs to the root group the bccefc5abfa2f53556da6c015e1862e42e7823a1 and is the management node of the root group. The root group has all permissions of the system. Moreover, as the root group has no parent group, the Pgroup field in the group account information is empty.

Further, a new node group (i.e., the child group of the root group) may be created in step S302 and the first target node is added to the node group.

S302, the management node of the root group broadcasts first permission control information in the blockchain system, wherein the first permission control information includes the member account information of the first target node and the group account information of a second node group to which the first target node belongs.

Exemplarily, the first permission control information may refer to the account information that is written in the genesis block in step S301, and is not described herein again, wherein the Pgroup field of the group account information of the second node group should be the identifier of the root group bccefc5abfa2f53556da6c015e1862e42e7823a1.

Further, the management node in the second node group may execute the step S303 to the step S308 to manage the permissions of the second target node.

S303, the management node in the second node group judges whether the second target node belongs to a non-management node in the second node group.

If the second target node belongs to the non-management node in the second node group, step S307 is executed; and if the second target node does not belong to the non-management node in the second node group, step S304 is executed.

S304, the management node in the second node group judges whether the node group to which the second target node belongs is the child group of the second node group.

If the node group to which the second target node belongs is the child group of the second node group, step S307 is executed; and if the node group to which the second target node belongs is not the child group of the second node group, step S305 is executed.

S305, the management node in the second node group judges whether the second node group is the grandparent group of the node group to which the second target node belongs.

If the second node group is the grandparent group of the node group to which the second target node belongs, step S306 is executed; and if the second node group is not the grandparent group of the node group to which the second target node belongs, step S308 is executed.

S306, the management node in the second node group judges whether the node group to which the second target node belongs allows to be managed by the grandparent group.

If the node group to which the second target node belongs allows to be managed by the grandparent group, step S307 is executed; and if the node group to which the second target node belongs does not allow to be managed by the grandparent group, step S308 is executed.

S307, the management node in the second node group broadcasts second permission control information in the blockchain system, wherein the second permission control information is used for changing the permissions of the second target node in the blockchain system.

S308, an operation in which the management node in the second node group changes the permissions of the second target node in the blockchain system is prohibited.

It is worth noting that, for the above method embodiments, for the sake of simple description, they are all expressed as a series of action combinations, but those skilled in the art should know that the present invention is not limited by the described action sequence. Secondly, those of skill in the art should also understand that the embodiments described in the specification are all preferred embodiments, and the actions involved are not necessarily required by the present invention.

The embodiment of the present disclosure further provides a non-transitory computer readable storage medium 1, the non-transitory computer readable storage medium 1 includes one or more programs, and the one or more programs are used for executing a permission management method of a blockchain system, wherein for the blockchain system, reference can be specifically made to the descriptions of the embodiment corresponding to FIG. 1, and thus it is not repeated herein, the method includes:

judging, by a management node in a first node group, whether a target node belongs to the first node group or belongs to a child group of the first node group, wherein the first node group is a node group of any level in the blockchain system; and if the target node belongs to the first node group or belongs to the child group of the first node group, broadcasting permission management information to the blockchain system, wherein the permission management information includes group account information of the node group to which the target node belongs and member account information of a second node, and the permission management information is recorded in a new block when the new block is generated in the blockchain.

Optionally, the method further comprises:

if the target node does not belong to the first node group and does not belong to the child group of the target node group, judging whether the first node group is a grandparent group of the node group to which the target node belongs; and if the first node group is the grandparent group of the node group to which the target node belongs, judging whether the node group to which the target node belongs allows to be managed by grandparent group according to the group account information of the node group to which the target node belongs; and if the node group to which the target node belongs allows to be managed by the grandparent group, broadcasting the permission management information to the blockchain system.

Optionally, the method further comprises:

if the first node group is not the grandparent group of the node group to which the target node belongs, judging whether the target node joins any node group at present; and if the target node does not join any node group at present, broadcasting the permission management information to the blockchain system.

The embodiment of the present disclosure further provides a blockchain node 2, wherein the blockchain node 2 includes:

the above-mentioned non-transitory computer readable storage medium 1; and one or more processors for executing the programs in the above-mentioned non-transitory computer readable storage medium 1.

The preferred embodiments of the present disclosure have been described in detail above in combination with the drawings. However, the present disclosure is not limited to the specific details in the above embodiments, various simple modifications may be made to the technical solutions of the present disclosure within the scope of the technical idea of the present disclosure, and these simple modifications all fall within the protection scope of the present disclosure.

It should be further noted that the specific technical features described in the above specific embodiments may be combined in any suitable manner without conflict. In order to avoid unnecessary repetition, various possible combination manners are not additionally illustrated in the present disclosure.

In addition, various different embodiments of the present disclosure may be randomly combined as long as they do not deviate from the idea of the present disclosure, and the combinations should also be regarded as the content disclosed by the present disclosure.

The invention claimed is:

1. A blockchain system, wherein the blockchain system Comprises:

a plurality of node groups, each said node group includes a node device as a management node, group account information of each node group is stored in a block of the blockchain, the group account information of each node group comprises the following fields: a PGroup field used for expressing the parent group of the node group; an Auth field used for expressing a permission set corresponding to the node group; a SubStatus field used for expressing the child group of the node group;

each node in the node group has all permissions in the permission set of the node group;

the permissions of the nodes in each node group are controlled by a management node in a parent group of the node group, wherein the parent group of the node group refers to a node group of an immediately higher level that creates the node group;

the permissions in the permission set of each node group are more than those of the permission set corresponding to a child group of the node group, the child group of the node group refers to a next level node group created by the node group;

the management node in each node group is used for modifying or deleting the permissions of the nodes in the node group and the nodes in the child group of the node group;
a member account information of each node is stored in the block of the blockchain, and the member account information includes the permissions of the node;
each node queries the recently stored group account information of the belonging group of the node and the member account information of the node in the blockchain when performing any operation, so as to determine whether the node has the permissions of executing the operation.

2. The blockchain system according to claim 1, wherein the member account information comprises the following fields:
an Auth field used for expressing the permissions of the node;
a GroupStatus field used for expressing the node group to which the node belongs; and an Organizer field used for describing whether the node is the management node in the node group to which the node belongs.

3. The blockchain system according to claim 1, wherein the blockchain system comprises M node groups, wherein the Nth node group is the child group of the N−1th node group, and N is a positive integer greater than 1 and less than M; and
wherein, the group account information of the Nth node group further comprises a DirectMgr field used for indicating whether the Nth node group allows to be managed by grandparent group, and wherein the grandparent groups of the Nth node group refer to the first to the N−2th node groups.

4. The blockchain system according to claim 1, wherein the node in the blockchain system comprises at least one of the following permissions:
a permission of whether to allow the participation in a consensus algorithm, a permission of whether to allow to transfer the amount, a permission of whether to allow to receive the amount, a permission of whether to allow to deploy a contract, a permission of whether to allow to call the contract, a permission of whether to allow to access a blockchain, and what permissions may be given to other nodes.

5. A permission management method of a blockchain system, the method is applied to a management node in the blockchain system according to claim 1, the method comprising:
judging, by the management node in a first node group, whether a target node belongs to the first node group or belongs to a child group of the first node group in response to a request for permission control on the target node, wherein the first node group is any one of the plurality of node groups;
if the target node belongs to the first node group or belongs to the child group of the first node group, the management node broadcasting permission management information to the blockchain system, the permission management information includes group account information of the node group to which the target node belongs and member account information of the target node, the permission management information is recorded in a new block when the new block is generated in the blockchain.

6. The permission management method according to claim 5, further comprising:

if the target node does not belong to the first node group and does not belong to the child group of the target node group, the management node judging whether the first node group is a grandparent group of the node group to which the target node belongs;
if the first node group is the grandparent group of the node group to which the target node belongs, the management node judging whether the node group to which the target node belongs allows to be managed by grandparent group according to the group account information of the node group to which the target node belongs; and
if the node group to which the target node belongs allows to be managed by the grandparent group, the management node broadcasting the permission management information to the blockchain system.

7. The permission management method according to claim 6, further comprising:
if the first node group is not the grandparent group of the node group to which the target node belongs, the management node judging whether the target node joins any node group at present; and
if the target node does not join any node group at present, the management node broadcasting the permission management information to the blockchain system.

8. A non-transitory computer readable storage medium, the non-transitory computer readable storage medium is applied to a management node in the blockchain system according to claim 1, wherein the non-transitory computer readable storage medium comprises one or more programs, and the following method steps are implemented when the one or more programs are executed by the processor:
judging, by a management node in a first node group, whether a target node belongs to the first node group or belongs to a child group of the first node group in response to a request for permission control on the target node, wherein the first node group is any one of plurality of node groups in the blockchain system;
if the target node belongs to the first node group or belongs to the child group of the first node group, the management node broadcasting permission management information to the blockchain system, the permission management information includes group account information of the node group to which the target node belongs and member account information of the target node, the permission management information is recorded in a new block when the new block is generated in the blockchain.

9. The blockchain of system according to claim 1, wherein, the blockchain node is used as a management node with blockchain system, the blockchain node comprising:
a memory, on which a computer program is stored; and
a processor, used for executing the computer program in the memory to implement the following method steps:
judging, by a management node in a first node group, whether a target node belongs to the first node group or belongs to a child group of the first node group in response to a request for permission control on the target node, wherein the first node group is any one of plurality of node groups in the blockchain system;
if the target node belongs to the first node group or belongs to the child group of the first node group, the management node broadcasting permission management information to the blockchain system, the permission management information includes group account information of the node group to which the target node belongs and member account information of the target node, the permission management information is recorded in a new block when the new block is generated in the blockchain.

\* \* \* \* \*